July 13, 1965

L. WETHERILL ETAL 3,195,082

ELECTRICAL REACTOR

Filed Feb. 27, 1963

Inventors:
Lynn Wetherill,
Harry C. Stanley,
by Gilbert P. Tarleton
Their Attorney.

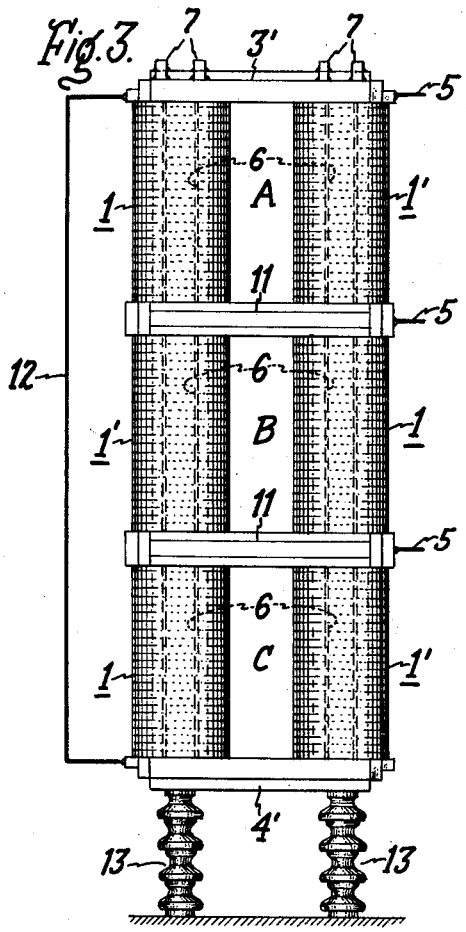
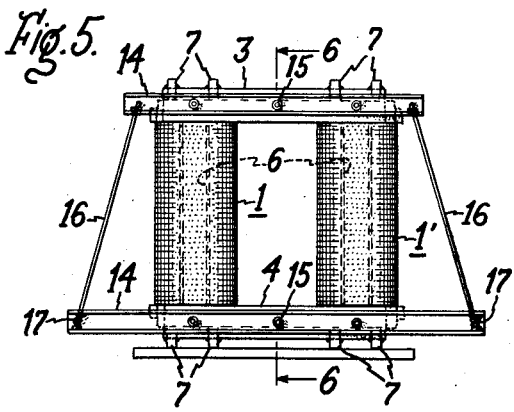
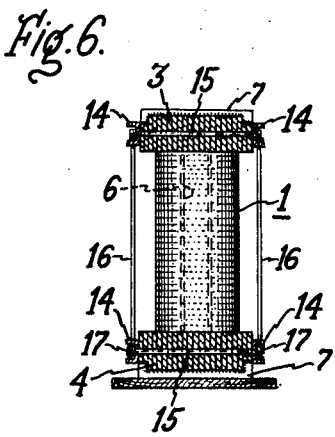
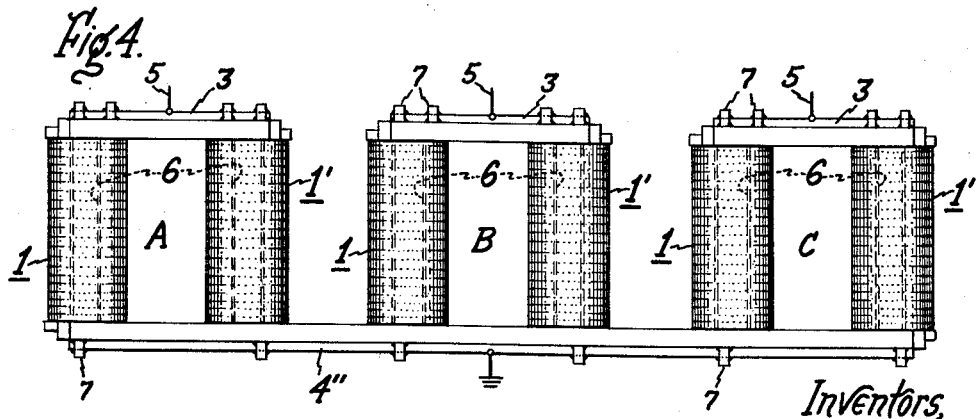

United States Patent Office 3,195,082
   Patented July 13, 1965

3,195,082
   ELECTRICAL REACTOR
   Lynn Wetherill and Harry C. Stanley, Pittsfield, Mass., assignors to General Electric Company, a corporation of New York
   Filed Feb. 27, 1963, Ser. No. 261,289
   6 Claims. (Cl. 336—12)

This invention relates to electrical reactors and more particularly to improvements in high voltage, especially EHV, shunt reactors.

EHV is an abbreviation for extra high voltage, but the dividing line between high voltage and extra high voltage as used in connection with commercial frequency alternating current electric power transmission systems has not been precisely defined or agreed upon. For the purposes of this invention, it can be considered as 230 kilovolts. The upper limit of EHV is still less clearly defined as EHV systems are continually being constructed and designed for ever higher voltages, the highest such voltage to date being approximately 800 kilovolts.

A shunt reactor is used in such systems for supplying or compensating for the line charging current which is very considerable due to the high voltages and long distances involved.

One of the problems which has existed in such reactors is the increasingly destructive effect of cross flux in the reactor winding or windings near its ends as the size and voltage rating increase. The reason the flux tends to deviate from the axial direction of the winding or windings is, of course, that such reactors have a high reluctance magnetic circuit in order to draw the high magnetizing current required of them. However, the cross flux interacts with the current in the coil conductors to produce strong axial compressive forces in the coils which damage their insulation and due to the alternating nature of these forces set the structure into vibration of destructive amplitude.

This invention is a modification or improvement on the invention shown and described in an application Serial No. 261,292, filed concurrently herewith in the name of Lynn Wetherill and assigned to the present assignee, which in turn is a modification or improvement on an invention disclosed and broadly claimed in an application Serial No. 261,294, filed concurrently herewith in the name of Alanson U. Welch and assigned to the present assignee. The Welch invention solves the cross flux problem by a special magnetic yoke arrangement external to the coil in combination with a nonmagnetic structural member inside the coil, and the Lynn Wetherill invention is directed to reducing the amount of magnetic material required in the external yoke but requires at least four electrically parallel conducting paths or coil portions.

In accordance with the present invention, the advantages of the fewer number of parallel conducting paths of the Welch invention and the reduced amount of iron in the external yoke of the Wetherill invention are combined in a reactor structure in which one of the yokes is operated at line potential or "hot" in the technical vernacular.

An object of the invention is to provide a new and improved electrical reactor.

Another object of the invention is to provide a new and improved EHV shunt reactor.

An additional object of the invention is to provide a high voltage reactor with separate magnetic yoke shields which prevent cross axial flux in the coils and which also act as electrostatic shields for both the line and grounded ends of the coils.

The invention will be better understood from the following descriptions taken in connection with the accompanying drawing, and its scope will be pointed out in the appended claims.

In the drawing,

FIG. 3 is a three phase delta connected reactor embodying the invention,

FIG. 4 is a Y connected three phase reactor embodying the invention,

FIG. 5 is a modification showing another form of clamping arrangement from that shown in FIGS. 1 and 2, FIG. 6 is a sectional view taken on line 6—6 of FIG. 5.

Figure 1:
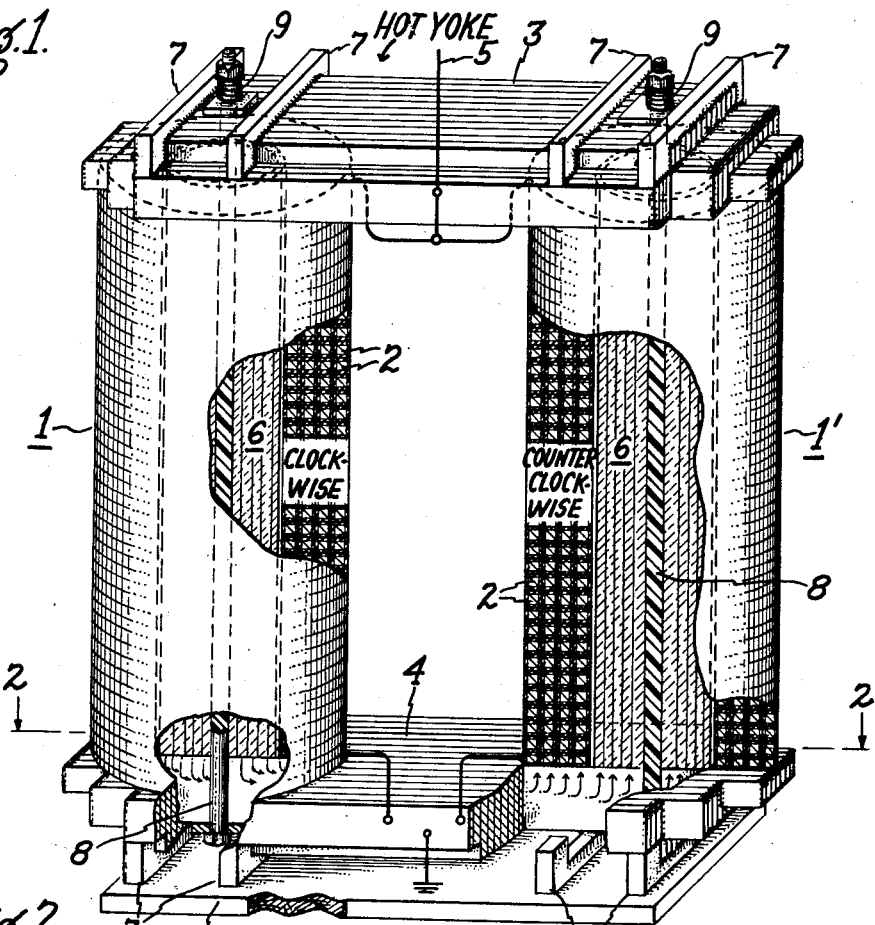
FIG. 1 is an elevation view of the preferred embodiment of the invention.

Referring now to the drawing and more particularly to FIG. 1, there is shown therein a pair of conductive cylindrically shaped electrical coils 1 and 1' whch may be identical except that they are respectively reversely oriented end to end with respect to each other so that, for example, looking down on them from the top one will be wound clockwise and the other counterclockwise. Preferably the coils each consist of a plurality of serially connected disc or pancake coil sections 2. Laid across or magnetically joining the adjacent ends of the respective coils are electrically conducting magnetic yoke members 3 and 4, 3 being shown at the top and 4 at the bottom. As shown most clearly in FIG. 2 these members are laminated with the laminations extending edgewise to the end faces of the coils and the yoke members are at least as wide and preferably somewhat wider than the outer diameter of the coils in the vicinity thereof so that the path of least reluctance for magnetic flux in the coils is in the axial direction into and out of the magnetic yoke members and not in a cross direction relative to such axial direction, this being true throughout the disc area of the end faces of the coils.

The ends of the coils 1 and 1' adjacent the yoke 3 are electrically connected thereto and to a line lead 5 so that the yoke 3 is operated at line potential, i.e. at the same potential as the upper or line ends of the coils 1 and 1'. Consequently, no extra insulation is required between the yoke 3 and the adjacent end faces of the coils as would be the case if the yoke 3 were operated at ground potential. While such extra insulation could, of course, be provided it would necessarily result in an appreciable spacing or separation between the yoke 3 and the adjacent end faces of the coils so that the magnetic shielding action of the yoke 3 would be very much less effective and in fact for practical purposes it would be ineffective.

Another advantage of operating the yoke 3 hot or at line potential is that it will then act as an electrostatic shield for the line end of the winding or coils due to its being at line potential and having a comparatively large conductive or capacitive surfaces at the same potentials as the outer ends of the coil. The resulting increased series capacitance of the coil reduces electrostatic stress applied to the end turns upon occurrence of steep voltage surges or impulses.

The ordinarily comparatively sharp corners of the yoke 3 should be rounded and preferably also the edges of the yoke 3 should be rounded so as to reduce the tendency for corona discharges therefrom due to the fact that the yoke 3 is at very high potential relative to adjacent grounded structures or surfaces such as the wall of an enclosing metal tank. In fact, it may be desirable to provide additional rounded conductive electrostatic shielding means between the hot yoke 3 and such grounded surfaces or structures.

The opposite ends of the windings or coils are connected directly to the yoke 4 which is grounded so that the yoke 4 also magnetically shields the grounded ends of the coils and also provides electrostatic shielding for the grounded ends of the coils under impulse conditions.

Mounted inside the coils or coil windows and having transverse dimensions corresponding essentially to the inner diameter of the coils are insulating para or non-magnetic structural columns 6 which are strong in compression and which may be made of any suitable material such, for example, as porcelain, glass or other ceramic composition. These end faces are substantially flush with the end faces of the coils and serve to bear the mechanical load or forces produced by the magnetic attraction between the yokes 3 and 4 which otherwise would tend to crush the coils and destroy their electrical insulation.

In order to transfer the forces on the outer laminations which are not over the columns 6 to those columns stiff transverse steel beams 7 are welded to all of the laminations.

In order to use no more magnetic material in the yokes 3 and 4 than is necessary, they have been shown tapered at their outer ends in two directions starting beyond the center of the coils. Thus although the yoke surfaces are flat on their inner sides where they contact the ends of the coils 1 and 1', they taper in width crosswise of the laminations and also in height parallel to the laminations at the ends. As shown by way of example, both tapers are in two steps. The stepped taper crosswise of the laminations is for the purpose of not having any more magnetic material extending beyond the outer arc or periphery of the coils at the ends of the yokes than is necessary to completely cover the ends of the coils. The steps in the direction parallel to the laminations is justified because those portions of the laminations need carry only the flux from the outer halves of the coils whereas the remaining portions of the laminations must carry the entire flux of the coils. Thus on the line joining the axes or center lines of the coils, i.e. at the ends of the yokes and at their centers crosswise of their laminations the flux is a minimum, and hence the area of magnetic material necesary to carry this flux can be a minimum as indicated by the lowest and narrowest steps at the extreme ends of the yokes 3 and 4.

For the same reasons, the main portions of the yokes 3 and 4 extending between their stepped ends are also generally rounded stepwise in that the laminations in a center zone are wider than the laminations in outer zones on both sides of the center zone. This is because the coil flux density is highest in the cross sectional area defined by the inner coil diameter and progressively decreases to zero in going radially outward from the inner diameter to the outer diameter.

The yoke shapes can be visualized as the halves of a longitudinally split cylinder with rounded ends.

Figure 2:
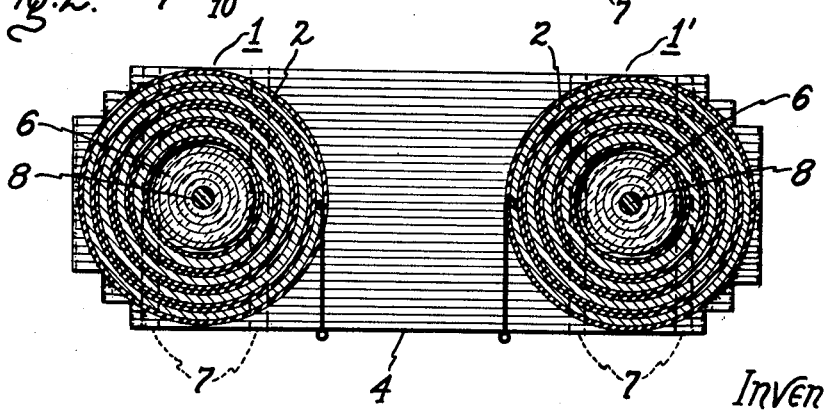
FIG. 2 is a horizontal sectional view taken on the line 2—2 of FIG. 1.

Because it is difficult to fire porcelain or cast glass with thickness of more than a few inches without setting up high internal thermal strains, and as the diameter of the columns 6 in a large EHV reactor will be measured in feet rather than inches, the columns 6 are preferably made of concentric sleeves or cylinders of porcelain or glass assembled in telescoping relation, each having a maximum wall thickness of no more than can be made without acquiring objectional internal thermally produced stresses and this concentric cylindrical construction is illustrated in the drawing at FIGS. 1 and 2.

For clamping the structure together and preventing undue vibration, inasmuch as the net instantaneous force on the top yoke 3 can go negative under certain conditions and actually tend to lift the yoke 3 off the coil faces, tie straps 8 of insulating material are extended through the center bore of the columns 6. By means of pressure plates and nuts on the ends of the tie rods 8 in combination with compression springs 9 any desired amount of clamping force may be applied to the structure. It is of course necessary that the tie straps 8 be of insulating material because the yoke 3 is at line potential whereas the yoke 4 is at ground potential. The springs 9 maintain follow up clamping pressure on the column ends and keep the yokes tight against the column ends under dimensional changes due to temperature variations.

By mounting the entire structure on a bottom support having a certain amount of resilience such as wooden planks or beams 10 instead of mounting it directly on rigid material having practically no give like a concrete pad or floor the bottom yoke 4 can vibrate without transmitting its entire vibratory motion through the columns 6 to the upper yoke. In other words, with some resilience in the bottom support 10 the entire structure can have a node or null point for vibration corresponding generally to the midpoint of the coils and in this way the amplitude of the vibration of the upper and lower yokes tends to be equalized.

FIG. 3 shows a modification in which generally speaking three reactors like the one shown in FIGS. 1 and 2 are mounted end to end or stacked one on top of the other so as to constitute the three phases A, B, and C of a three phase reactor. The upper yoke 3' can correspond to the yoke 3 in FIG. 1 and the lower yoke 4' can correspond to lower yoke 4 in FIG. 1. It is unnecessary to use double intermediate yokes as would be the case if three reactors like FIG. 1 were actually stacked one on top of the other and it is only necessary that the intermediate yokes indicated at 11 be of substantially the same lamination width as the yokes 3' and 4'. However, at their ends the yokes 11 should not be tapered in a direction parallel to the laminations but only in a direction crosswise of the laminations i.e. only as shown in FIG. 2. The yokes can serve as line terminals for line leads 5 and the two end yokes are directly interconnected by a conductor 12 so that the reactor is delta connected and all of the yokes operated at line to ground potential, the potential between any two of the other yokes being line to line potential. With such a construction, it is of course necessary to insulate the bottom yoke 4' from ground and this may be done by mounting the entire structure on post or pedestal insulators 13. It is preferable to reverse the flux of phase B as indicated by the reverse position of its coils 1 and 1', so that the phase B flux is displaced 60 electrical degrees, instead of 120 electrical degrees, from the phase A and phase C fluxes in yoke member 11. This makes the yoke 11 fluxes equal to, rather than $\sqrt{3}$ times, the end yoke fluxes.

FIG. 4 is a three phase Y connected reactor having phases A, B, and C each of which corresponds generally to the reactor shown in FIGS. 1 and 2 except that the bottom yoke 4" may be an extra long common yoke for all the phases which is operated at ground potential while the upper hot yokes 3 of the phases A, B, and C each operate at line potential of the respective phases.

FIG. 5 and 6 illustrate another form of clamping arrangement in which channel beams or bars 14 are attached to opposite sides of the yoke members 3 and 4 by through clamping bolts 15. Interconnecting the ends of the channel bars 14 are insulating tensioned clamping straps 16 which by means of suitable compression springs 17 can apply any desired pick-up clamping pressure to the structure. By making the lower channel members 14 longer than the upper channel members the clamping structure will automatically tend to prevent the upper yoke 3 from moving endwise, i.e. it will keep it centered on the tops of the coils 1 and 1'.

While there have been shown and described particular embodiments of the invention, it will be obvious to those skilled in the art that changes and modifications may be made without departing from the invention and therefore it is intended by the appended claims to cover all such changes and modifications as fall within the true spirit and scope of the invention.

What we claim as new and desire to secure by Letters Patent of the United States is:

1. A shunt reactor having a voltage rating of the order of at least 200 kilovolts for connection across an electric circuit comprising, in combination, duplicate circular cross-section cylindrical conductive coils mounted with their axes in parallel spaced apart relation and their adjacent pairs of end faces in coplanar relation, each said coil comprising a plurality of serially connected coaxial pancake sections and being provided with opposite end terminals, separate magnetic steel yoke members bridged across each coplanar pair of said end faces, each said yoke member being at least as wide as the outside diameter of one of said coils and at least as long as the axial spacing therebetween plus a diameter of one of said coils, said coils being oppositely wound and electrically connected in parallel circuit relation between opposite pairs of said end terminals, means connecting said opposite pairs of end terminals respectively to said separate yoke members for electrical operation of said yoke members at opposite line voltages of said electric circuit, and separate structural columns of compressively strong paramagnetic electrical insulating material in the windows of said coils for bearing the attractive magnetic force between said yoke members and keeping it from being applied to said coils, said yoke members magnetically shielding said coils in the sense that they prevent cross axial direction flux in said coils near their ends which would produce high axial electromagnetic compressive forces in said coils and create vibration of destructive amplitude, said yoke members also electrostatically shielding said coils in the sense that their capacitances favorably influence the distribution of voltage in said coils under impulse conditions.

2. A high voltage shunt reactor comprising, in combination, a pair of similar cylindrical shaped electrical coils spaced side by side with their axes parallel and their adjacent pairs of end faces coplanar, right circular cylindrical shaped structural columns of nonmagnetic material extending axially through said coils and of the same axial length as said coils, a pair of flat elongate laminated magnetic yoke members each bridge across a coplanar pair of said end faces of said coils, the laminations of each said yoke member being disposed parallel to the sides of the yoke and in edgewise contact with a coplanar pair of end faces of said coils and columns, the width and length of said yoke members being such that they cover the entire end face areas of said coils, the length of said laminations tapering in steps from longest at the center to shortest at the sides of each said yoke member, the longest of said laminations being substantially equal to the distance between the axes of said coils plus an outside diameter of one coil and the shortest lamination being at least equal to the distance between the axes of said coils, the ends of the laminations longer than the shortest tapering stepwise in width from narrowest for the longest to widest for the shortest.

3. A three phase high voltage shunt reactor comprising six equal cylindrical conductive coils and four straight laminated magnetic yoke members, said yoke members lying in spaced parallel planes, a different pair of said coils in side by side relation with their axes parallel to each other and perpendicular to the planes of said yoke members extending between each adjacent pair of yoke members with the ends of the coils electrically connected to their adjacent yoke members, the laminations of the yoke members being perpendicular to the planes of the yoke members, the yoke members being as wide crosswise of their laminations as the diameter of said coils, an electrical connection between the two end yoke members, and three phase line terminals connected respectively to the intermediate yoke members and one of the end yoke members whereby said reactor is delta connected with each yoke member at line to neutral potential and each coil having line to line potential between its ends and whereby each pair of side by side related coils between a common pair of yoke members is a phase of said reactor with two electrically parallel coils, the coils of each such pair being reversed so that they are magnetically in series with each other through the yoke members they are between, and a nonmagnetic electrically insulating structural column inside each coil with its ends in contact with different yoke members.

4. A reactor as in claim 3 in which the magnetic polarity of the center pair of coils is reversed relative to the two end pairs of coils whereby the magnetic flux in the two intermediate yoke members is equal in magnitude to the magnetic flux in the two end yoke members.

5. A reactor as in claim 3 in which the planes of said yoke members are horizontal and vertically spaced, and electrical insulating columns beneath the lowermost yoke member for supporting said reactor and insulating it from ground potential.

6. A three phase high voltage shunt reactor comprising in combination, an elongated laminated normally grounded magnetic yoke member, six equal size cylindrical electrical coils each having a centrally positioned axially extending structural column of paramagnetic insulating material, said coils and columns having substantially flush end faces, said coils being grouped in electrically parallel connected pairs with all their axes coplanar and parallel, corresponding end faces of all of said coils throughout their area being in edgewise contact with the laminations of said elongated yoke member, the corresponding electrical ends of said coils being electrically connected to said elongated yoke member, three separate laminated magnetic yoke members each extending across the opposite coplanar end faces of one said pair of coils with said opposite end faces of said one pair of coils in edgewise contact with the laminations of said separate yoke member over the entire area of said end faces, and means electrically connecting opposite ends of said coils to the adjacent yoke members respectively thereby to connect each said pair of coils in parallel circuit relation, the coils of each said pair of coils being relatively reversely wound thereby to dispose the coils of each said pair magnetically in series, whereby said pair of coils comprises a different phase of a three-phase Y-connected reactor with said elongated yoke member electrically neutral.

References Cited by the Examiner
UNITED STATES PATENTS
2,279,239  4/42  Meyerhans _____ 336—60 X
FOREIGN PATENTS
1,138,156  10/62  Germany.

JOHN F. BURNS, *Primary Examiner.*